United States Patent [19]

Höelzl et al.

[11] 4,119,795
[45] Oct. 10, 1978

[54] SYSTEM FOR TRANSMITTING ASYNCHRONOUS BIT TRANSITIONS OF DATA SIGNALS USING TIME-DIVISION MULTIPLEXING

[75] Inventors: Ludwig Höelzl, Weidach; Jöerg Mäenhardt, Munich; Konrad Reisinger, Zorneding; Johannes Singer, Munich, all of Fed. Rep. of Germany

[73] Assignee: Siemens Aktiengesellschaft, Munich, Fed. Rep. of Germany

[21] Appl. No.: 814,895

[22] Filed: Jul. 12, 1977

[30] Foreign Application Priority Data

Aug. 5, 1976 [DE] Fed. Rep. of Germany ....... 2635306

[51] Int. Cl.² ............................................. H04Q 11/20
[52] U.S. Cl. .................................... 178/50; 179/15 BA
[58] Field of Search ......... 179/15 BA, 15 BS, 15 AT; 178/50

[56] References Cited

U.S. PATENT DOCUMENTS

| 3,535,450 | 10/1970 | Vollmeyer | 179/15 BS |
| 3,761,621 | 9/1973 | Vollmeyer | 178/50 |
| 3,862,369 | 1/1975 | Hessenmuller | 179/15 BA |
| 3,934,093 | 1/1976 | Thyselius | 179/15 BA |

Primary Examiner—David L. Stewart
Attorney, Agent, or Firm—Schuyler, Birch, Swindler, McKie & Beckett

[57] ABSTRACT

A circuit arrangement for facilitating the transmission of asynchronously occurring binary data values is described. According to prior art systems, each binary value change is assigned a multibit pulse group by means of channel units. These channel units require considerable technical complexity if a great many data sources are present. It is the principal object of the invention to replace the channel units by a centralized device. In accordance with the teachings of the invention, there are provided at the transmit and receive ends centralized coarse and fine time slot Raster counters and bit transition discriminators which process the pulse messages of all channels.

3 Claims, 9 Drawing Figures

SYSTEM FOR TRANSMITTING ASYNCHRONOUS BIT TRANSITIONS OF DATA SIGNALS USING TIME-DIVISION MULTIPLEXING

BACKGROUND OF THE INVENTION

The invention relates to a system for transmitting asynchronous bit transitions of data signals using time-division multiplexing, wherein the signals are applied to a transmit-end multiplexer via a plurality of channels. There are produced with the aid of a transmit-end coarse Raster counter and a fine Raster counter pulse messages by means of which the bit transitions are signaled from the transmit end to the received end. The transmit-end multiplexer and a receive-end multiplexer are controlled with transmit-end or receive-end address signals, a clock signal being generated by means of a receive-end fine Raster counter activating the channel unit over which the data signal is applied to a data processing terminal equipment.

The "multiple sampling unit with floating index" method is known for the speed-transparent transmission of data in TDM systems. In this system, upon arrival of a bit transition, a pulse message is formed and transmitted from the transmit end to the receive end. This pulse message consists of a number of bits and contains the information on the new binary digit as well as information on the time of occurrence of the particular bit transition. It is a known practice to produce and process at the channel level the pulse messages assigned to the individual channels. The technical complexity for producing and processing the pulse messages increases with the number of channels.

SUMMARY OF THE INVENTION

It is the principal object of the invention to provide a system that permits a centralized production and processing of pulse messages.

This fundamental object is achieved in accordance with the principles of the invention in that there are provided for each channel transmit-end and receive-end registers which respectively store the storage contents of a transmit-end and of a receive-end buffer storage in synchronism with the clock pulse pattern of the address signals. A transmit-end and a receive-end bit-transition discriminator is provided which receives via the respective transmit-end and receive-end register on one side the old binary digit of the data signal and on the other, the new binary digit of the data signal. The respective discriminator signals a bit transition with a transmit-end and a receive-end bit-transition signal. The transmit-end and the receive-end fine Raster counter are respectively connected to the transmit-end and the receive-end register and the counter readings thereof are changed with the bit-transition signal. A transmit-end pulse message switch is provided which reads with the bit-transition signal the new binary digit of the data signal and the counter reading of the fine Raster counter into the buffer storage.

The coarse Raster counter is connected on the input side to the register and on the output side to the buffer storage. A transmit-end readout switch is provided whose operating positions are set by means of the transmit-end coarse Raster counter. The readout switch inputs are connected sequentially to the locations of the register in which the individual bits of the pulse message are stored. The pulse message is dispatched over the output of the readout switch.

In case of agreement between the time-slot-pattern bits of the pulse message and the counter reading of the receive-end fine Raster counter, the clock signal is supplied which activates the channel unit assigned to the address.

In the presence of a fairly large number of channels, the system designed in accordance with the principles of the invention is characterized by a comparatively simple construction because only the number of transmit-end and receive-end registers increases with the number of channels; the technical expenditure for the other components such as for the coarse and the fine Raster counters, the address generators, the buffer storages and the bit-transition discriminators, does not increase with the number of channels. Rather, these units are utilized sequentially for the production and processing of the pulse messages.

To minimize the technical expenditure and the space required, it is advisable to choose the transmit-end and the receive-end registers as parts of a respective transmit-end and a receive-end addressable mass storage controlled with the aid of the transmit-end and the receive-end address signals.

To assure correct signalling of bit transitions occurring at the transmit end, it is convenient to equip the transmit-end bit-transition discriminator with a first and a second comparator means, that the first or the second comparator means signals a bit transition at different instants, and that the bit-transition signal is supplied only if the first comparator means signals a bit transition and the second comparator means signals no bit transition.

BRIEF DESCRIPTION OF THE DRAWINGS

The following is a description of practical embodiments of the invention by reference to FIGS. 1–9 wherein.

DETAILED DESCRIPTION OF THE DRAWINGS

Figure 1:
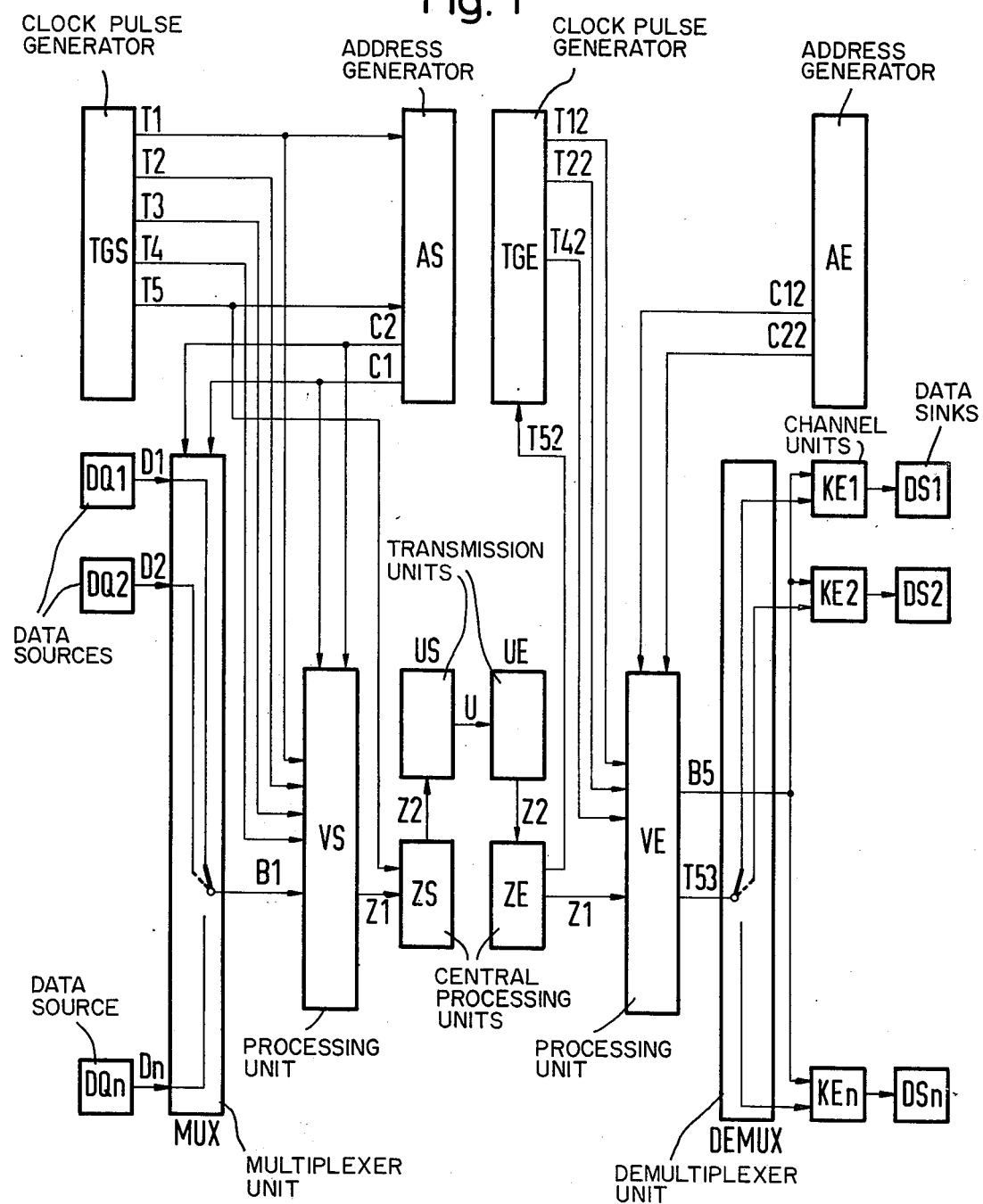
FIG. 1 is a system for transmitting asynchronous bit transitions of data signals using time-division multiplexing.

FIG. 1 shows a TDM data transmission system. At the transmit end are located data sources DQ1, DQ2 . . . DQ$n$, multiplexer MUX, clock pulse generator TGS, processing unit VS, address generator AS, central processing unit ZS and transmission unit US.

At the receive end are located transmission unit UE, central processing unit ZE, clock pulse generator TGE, processing unit VE, demultiplexer DEMUX, address generator AE, channel units KE1, KE2 ... KEn and data sinks or receivers DS1, DS2 ... DSn. For simplicity, only three data sources are illustrated at the transmit end and only three data sinks at the receive end, whereas in practice a substantially greater number of data sources or data sinks are provided.

The data to be transmitted with the TDM system are output from data sources DQ1 to DQn. This is a speed-transparent asynchronous data transmission system. Thus the individual bits of the data D1 to Dn output from the data sources can occur at any given points of time and are not bound by a prespecified bit frame or character frame. Multiplexer MUX is shown in symbolic form by a switch which sequentially supplies via its output the data D1 to Dn to the inputs of the multiplexer. Multiplexer MUX is controlled with address signals of address generator AS. For example, the address "one" is set with signal C1, for the duration of which the switch of multiplexer MUX occupies the switching position shown by the solid line, whereas the address "two" and the switching position of the switch shown by the dotted line are set with signal C2.

A number of address lines are in general provided, the address signals transmitted via these address lines representing binary numbers and corresponding addresses.

Clock pulse generator TGS produces clock signals for the operation of address generator AS and of processing unit VS. Signal Z1 is supplied via the output of processing unit VS to transmit-end central processing unit ZS in which a frame-alignment word is added to signal Z1 for the TDM frame alignment. In this way, signal Z2, which is supplied via transmission unit US, is obtained and transmitted from there via transmission circuit U to receive-end transmission unit UE. Clock signal T5 signals the TDM frame and applies clock pulses to address generator AS and to central processing unit ZS.

At the receive end the individual bits of the data to be transmitted are supplied to channel units KE1 to KEn with the aid of central processing unit ZE, processing unit VE, demultiplexer DEMUX, clock pulse generator TGE and address generator AE. These channel units are activated for storing the individual bits only when they receive appropriate clock signals from demultiplexer DEMUX. The data are routed to data sinks or receivers DS1 to DSn via the outputs of channel units KE1 to KEn.

Transmitter Processing Unit VS

Figure 2:
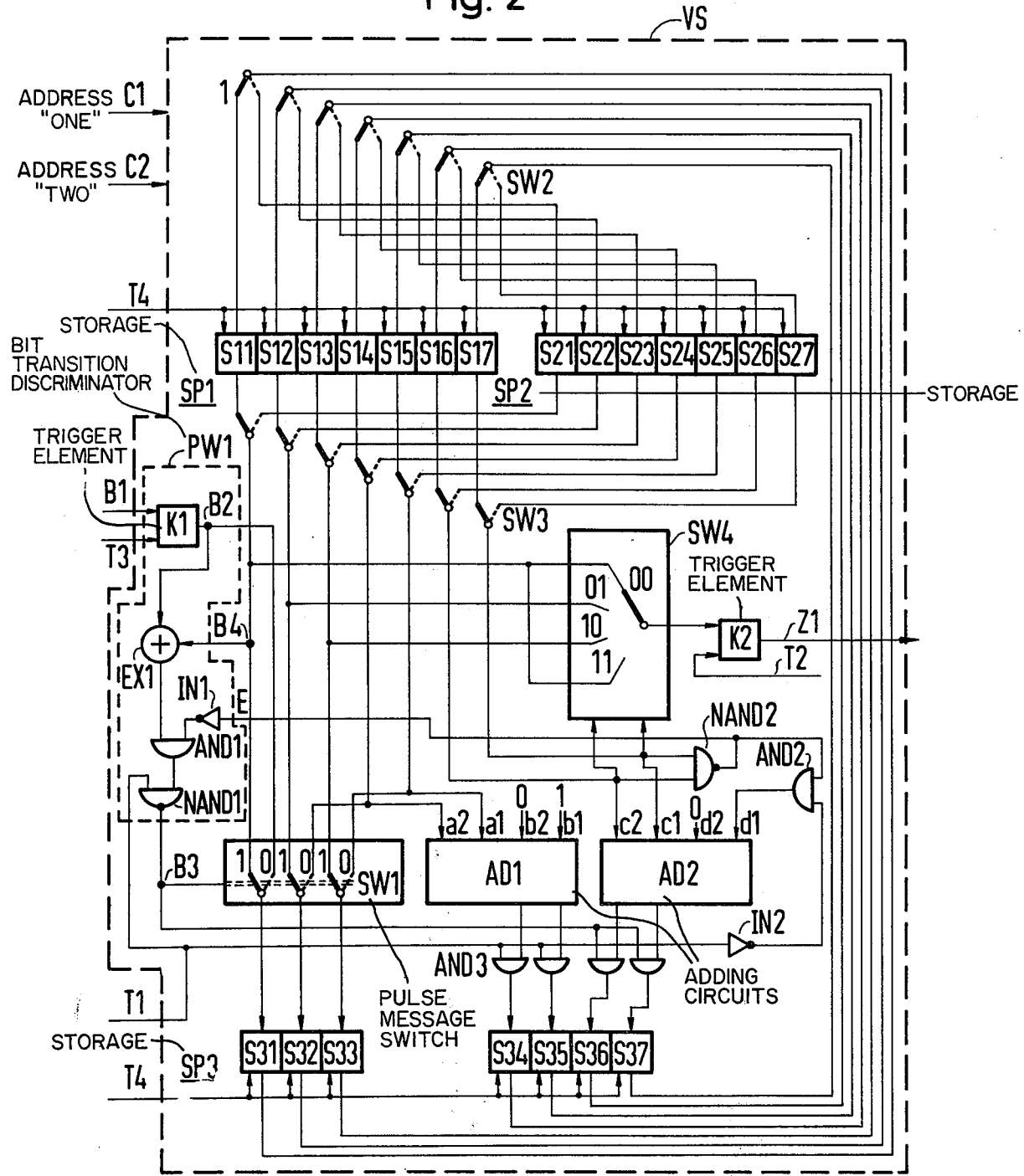
FIG. 2 is a first practical embodiment of a transmit-end processing unit for centralized production of pulse messages.

FIG. 2 details the processing unit VS shown schematically in FIG. 1. For simplicity, only two addresses, corresponding to two data sources, are assumed in FIG. 2. The operating positions of switches SW2, SW3 shown by the solid line correspond to the address "one," and the operating positions of these switches shown by the broken line correspond to the address "two."

Processing unit VS comprises two trigger elements K1, K2, exclusive OR element EX1, inverters IN1, IN2, elements AND1, AND2, AND3, NAND1, NAND2, switches SW1, SW2, SW3, SW4, adding circuits AD1, AD2 and stored or storages SP1, SP2, SP3.

Figure 3:
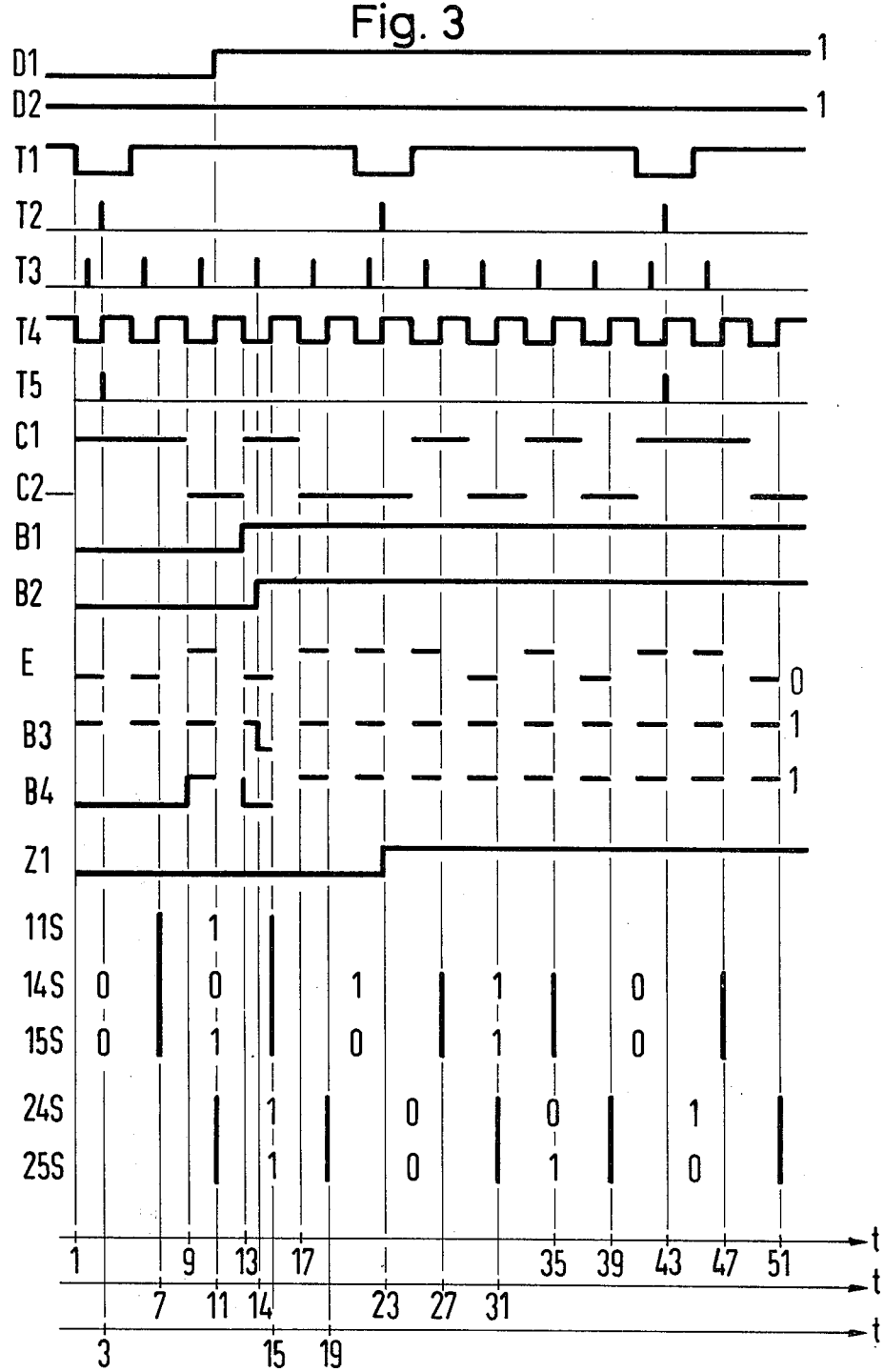
FIGS. 3 and 4 show a number of signals occurring during the operation of the processing unit shown in FIG. 2.

The operation of processing unit VS will be described hereinbelow with reference to the diagrams of FIG. 3. The x-axis refers to the time t. FIG. 3 (top) shows data D1 and D2 supplied by data sources DQ1 and DQ2, respectively (FIG. 1). As mentioned above, the bit transitions of data D1, D2 occur at any given points of time. Subsequent to the data are shown the clock signals T1, T2, T3, T4, T5 produced by the clock pulse generator TGS of FIG. 1.

The binary digits of binary signals are labeled 0 or 1. Diagrams C1 and C2 mark the setting of addresses "one" and "two," respectively. Address "one" is set in the time slots 1 to 9 and signal B1=0 is then obtained, because signal D1=0. Address "two" is set in time slots 9 to 13 and signal B=1 is then obtained, because signal D2=1. Address "one" is again set in time slots 13 to 17, so that signal B1=1 is obtained, since signal D1=1. Signal B1 is also further generated in this manner.

The pulse messages transmitted with signal Z1 signal the data transitions of signals D1 or D2. Clock signal T5 signals the TDM frame. For the duration of each TDM frame each channel is assigned a time slot pattern at the channel level which signals with two bits certain time slots. For each channel one bit of the pulse message is sent per TDM frame which signals the kind of bit transitions of signals D1 or D2 that has occurred and also indicates with the two bits of the time slot pattern the time of occurrence of the particular bit transition. Such pulse messages are transmitted to the receive end and bit transitions of the data signals are again produced at the correct instants from the data received.

In FIG. 3 the individual bits of a pulse message concerning address "one" are labeled 11S, 14S and 15S. The time slot pattern is defined by time slots 7, 15, 27, 35 and 47. All these time slots occur while address "one" is on, as shown by curve C1.

Time slot 7 is defined by the first positive edge of clock signal T4 after the pulse of clock signal T5. Time slots 15, 27 and 35 are defined by positive pulse edges of clock signal T4 throughout the duration of address "one." Time slot 47 is again defined by the first positive pulse edge of clock signal T4 after a pulse of clock signal T5.

The first bit of the pulse diagram labeled 11S indicates with the binary digit 0 or 1 a negative or positive bit transition, respectively. The bits labeled 14S or 15S mark the time when the particular bit transition took place.

Similarly, a pulse diagram relating to address "two" is transferred from the transmit end to the receive end. The time slot pattern bits are labeled 24S, 25S, the individual time slots occurring at instants 11, 19, 31, 39 and 51.

As shown in FIG. 2, multiplexer output signal B1 is routed to trigger element K1 which is stepped by clock signal T3. Thus, signal B2 is dispatched via the output of trigger element K1 and its pulse edges depend on clock signal T3, so that signal B2 is slightly delayed in relation to signal B1.

Bit-transition discriminator PW1 serves to signal the bit transitions of signals D1 and D2 and comprise trigger element K1 and elements EX1, IN1, AND1, NAND1. A bit transition of signals D1 or D2, as the case may be, is indicated with signal B3=0. To achieve this, signal B4 signalling the binary digit of signals D1 or D2 prior to a period of clock signal T3 is first generated. After a binary digit of signals D1 or D2 has changed, a signal "1" is dispatched by element EX1 to element AND1. Signal E=0 signals the complete transmission of a pulse message, indicated by the 11 positions of transmit end readout switch SW4 and the coarse Raster counter, including adder AD2. Thus, when element EX1 has supplied a signal "1" and when with signal E=0 a signal "1" is also applied to the second input of element AND1, a signal "1" is also supplied via the output of element AND1 that yields signal B3=0, taking account of element NAND1. Thus, signal B3=0 signals a bit transition of signal D1.

Signal B3 controls the operating position of switch SW1. Switches SW1 occupy with signal B3=1 or B3=0 their operating positions "1" or "0" as the case may be.

Storage locations S31 to S37 of storage SP3 store one bit each; these bits are read in with a positive edge of clock signal T4 and are then available until the next positive edge of clock signal T4. After reading the data into storage locations S31 to S37, the information is transferred with signal T4=1 as a function of the positions of switches SW2 either to the locations of register storage SP1 or to those of register storage SP2. Subsequently the data are read out with signal T4=0, as a function of the operating positions of switches SW3 either from the locations of storage SP1 or from those of storage SP2.

Transmit end readout switch SW4 can occupy a total of four operating positions labeled 00, 01, 10 and 11. Switch SW4 is controlled by the signals (C1, C2) read out either from locations S16, S17 or from locations S26, S27, depending on the position of switch SW3. When the two bits 00 or 01 or 10 or 11 are read out from these locations, switch SW4 occupies the operating position marked by the corresponding indications.

Binary adder AD1 adds the words $a2, a1$ and $b2, b1$, taking account of carry-overs, and supplies two bits of the result via its two outputs. The most significant bit is not read out. Binary number $a2, a1$ is variable, whereas the number 01 is constantly applied as the binary number $b2, b1$, as indicated in FIG. 2.

Binary adder AD2 adds binary numbers $c2, c1$ and $d2, d1$, taking account of carry-overs, and supplies two bits of the result via its two outputs, the most significant bit not being taken into account. Binary number $c2, c1$ is variable. $d2=0$ and only $d1$ of the binary number $d2, d1$ is variable.

Bistable trigger element K2 stores as an input signal the signal supplied by switch SW4 at the instants defined by clock signal T2. Signal Z1 is dispatched via the output of trigger element K2 and is applied to central processing unit ZS, as shown in FIG. 1.

Address "One"

After explaining the individual parts of the switching arrangement illustrated in FIG. 2, the operation of the whole switching arrangement will now be discussed with reference to Tables 1 and 2 which refer to the operations involving the addresses "one" (C1) and "two" (C2) respectively. Thus, Tables 1 and 2 refer to the operating positions of the switches SW2 and SW3 shown by the solid and the dotted lines, respectively.

Table 1 shows the bits supplied from the outputs of locations S11 to S17 and listed under the reference symbols of these locations. The bits applied to the inputs of locations S31 to S37 are listed under the reference symbols of these locations. First, it is assumed that the word 0100011 is stored in locations S11 to S17 at instant 3.

TABLE 1

| t | S11 | S12 | S13 | a2 S14 | a1 S15 | S16 | S17 | Z1 | S31 | S32 | S33 | S34 | S35 | S36 | S37 |
|---|-----|-----|-----|--------|--------|-----|-----|----|----|-----|-----|-----|-----|-----|-----|
| 3 | 0 | 1 | 0 | 0 | 0 | 1 | 1 | 0 | 0 | 1 | 0 | 0 | 0 | 1 | 1 |
| 7 | 0 | 1 | 0 | 0 | 0 | 1 | 1 | 0 | 0 | 1 | 0 | 0 | 1 | 1 | 1 |
| 15 | 0 | 1 | 0 | 0 | 1 | 1 | 1 | 0 | 1 | 0 | 1 | 1 | 0 | 0 | 0 |
| 27 | 1 | 0 | 1 | 1 | 0 | 0 | 0 | 0 | 1 | 0 | 1 | 1 | 1 | 0 | 0 |
| 35 | 1 | 0 | 1 | 1 | 1 | 0 | 0 | 0 | 1 | 0 | 1 | 0 | 0 | 0 | 0 |
| 43 | 1 | 0 | 1 | 0 | 0 | 0 | 0 | 1 | 1 | 0 | 1 | 0 | 0 | 0 | 1 |
| 47 | 1 | 0 | 1 | 0 | 0 | 0 | 1 | 1 | 1 | 0 | 1 | 0 | 1 | 0 | 1 |
| 55 | 1 | 0 | 1 | 0 | 1 | 0 | 1 | 1 | 1 | 0 | 1 | 1 | 0 | 0 | 1 |
| 67 | 1 | 0 | 1 | 1 | 0 | 0 | 1 | 1 | 1 | 0 | 1 | 1 | 1 | 0 | 1 |
| 75 | 1 | 0 | 1 | 1 | 1 | 0 | 1 | 1 | 1 | 0 | 1 | 0 | 0 | 0 | 1 |
| 83 | 1 | 0 | 1 | 0 | 0 | 0 | 1 | 0 | 1 | 0 | 1 | 0 | 0 | 1 | 0 |
| 87 | 1 | 0 | 1 | 0 | 0 | 1 | 0 | 0 | 1 | 0 | 1 | 0 | 1 | 1 | 0 |
| 95 | 1 | 0 | 1 | 0 | 1 | 1 | 0 | 0 | 1 | 0 | 1 | 1 | 0 | 1 | 0 |
| 107 | 1 | 0 | 1 | 1 | 0 | 1 | 0 | 0 | 1 | 0 | 1 | 1 | 1 | 1 | 0 |
| 115 | 1 | 0 | 1 | 1 | 1 | 1 | 0 | 0 | 1 | 0 | 1 | 0 | 0 | 1 | 0 |
| 123 | 1 | 0 | 1 | 0 | 0 | 1 | 0 | 1 | 1 | 0 | 1 | 0 | 0 | 1 | 1 |

Instant 3 is one of the readout instants, as indicated by signal T2 in FIG. 3. Signal Z1 may change at these readout signals. Since at instant 3 with S16=1 and S17=1 switch SW4 occupies operating position 11, the signal from storage location S11=0 is input to trigger element K2 via switch SW4. From instant 3 up to instant 23 (the next T2 time), signal Z1=0 is the output from trigger element K2.

At instant 3, signals S11=0, S12=1, S13=0, also are transferred directly to buffer storage locations S31, S32, S33 since with B3=1 (indicating no bit transition) the switches SW1 occupy their operating positions "1." Owing to signal T1=0, at instant 3 the word 00 is read into locations S34, S35. At instant 3, there are applied to adder AD2 on the one hand the word $c2, c1=11$ and on the other, the word $d2, d1=00$, because at this instant signal E=0. Thus, word 11 is read into locations S36, S37 via both outputs of adder AD2.

Shortly after instant 3 the contents of locations S31 to S37 are transferred to locations S11 to S17, so that these data are available prior to instant 7. The next positive pulse edge of signal T4 appears at instant 7 and in this way the data—partly changed—are transmitted to locations S31 to S37. With B3=1, SW1 in its "1" position (SW1=1), the contents of storage locations S11, S12, S13 therefore are transferred directly to locations S31, S32, S33. At instant 7 there are applied to adder AD1 on the one hand the word $a2, a1=00$ and on the other, the word $b2, b1=01$, so that now the word 01 is supplied and transferred to locations S34, S35. Adder AD2 operates at instant 7 as at instant 3, so that the word 11 is again read into locations S36, S37.

Shortly after instant 7 the data stored in locations S31 to S37 are transferred again, so that these data are available at instant 15. (For the moment we must disregard the positive pulse edge of signal T4 occurring at instant 11, because this pulse edge relates to address "two.") Thus the next positive pulse edge of signal T4 appears at instant 15 and data are transferred to locations S31 to S37 with this pulse edge. With B3=0 (indicating a bit transition) and SW1=0, the bits B1=1, S14=0, S15=1 are transferred to locations S31, S32, S33. There is now applied to adder AD1 the word a2, a1=01 as well as the word b2, b1=01, so that the result 10 is transferred to locations S34, S35. With B3=0 the locations S36, S37 store the word 00.

Shortly after instant 15 the contents of locations S31 to S37 are transferred to locations S11 to S17, so that they are available at instant 27. With B3=1 and with SW1=1 the word 101 is transferred to locations S31, S32, S33 at instant 27. The addition 10+01=11 is carried out in adder AD1, so that with T1=1 the word 11 is transferred to locations S34, S35. Signal T1=1 is inverted with inverter IN2, so that a signal 0 is supplied by element AND2 and the addition 00+00=00 is carried out in adder AD2. Thus, the word 00 continues to be stored in locations S36, S37.

At instant 35, with B3=1 the word 101 is transferred to locations S31 to S33. The addition 11+01=100 is carried out in adder AD1. Of this result 100 the first digit is not taken into consideration, so that the word 00 is read into locations S34, S35. Inverter IN2 supplies a signal 0 so that the operation 00+00=00 is again performed in adder AD2 and the word 00 is read into locations S36, S37.

At instant 43, with B3=1 the word 101 is transferred to locations S31, S32, S33. Owing to the signal T1=0 the word 00 is read into locations S34, S35. However, the signal T1=0 creates the conditions necessary for adder AD2 to be counted upward and the word 01 is read into locations S36, S37 with the addition 00+01=01.

Instant 43 is a readout instant. With SW4=00, the bit S11=1 is the input to trigger element K2, supplying the signal Z1=1.

Readout means 3, 43, 83 and 123 are underlined in Table 1. At these readout instants a fine Raster counter comprising adder AD1 and locations S34, S35, S14 and S15 are reset to counter reading 00, as shown by locations S34, S35. Thereafter the fine Raster counter is counted upward, with the counter readings 00, 01, 10, 11 signalling time slots of the time slot pattern. When a bit transition appears and is signaled with signal B3=0, the relevant time interval of the time slot pattern is read and stored in the pulse message. For example, there appears at instant 11 a bit transition of signal D1. However, this bit transition is not signaled with B3=0 until after instant 14 and only at instant 15 is the new polarity buffered in S31=1. With S32, S33=01 the interval of time is indicated when the relevant bit transition is received. Reference is made to FIG. 3 where the bit transition of signal D1 is assigned the interval of time signaled with word 14S, 15S=01. Thus, at instant 15 the pulse message 101 is read into buffer locations S31, S32, S33 and from instant 27 this pulse message 101 continues to be stored in register locations S11, S12, S13 as well as in locations S31, S32, S33 until the next bit transition. A new pulse message can be produced only when the old pulse message—in this case pulse message 101—has been transmitted in full.

After instant 27 the next readout instant when the readout of the pulse message starts is at instant 43. Adder AD2, locations S36, S37 and locations S16, S17 form a second counter which could be called a coarse Raster counter and which determines with its counter readings 00, 01 or 11 which of locations S11, S12 or S13 is read. At instant 43 this coarse Raster counter has with S16, S17=00 the counter reading 00 and bit S11=1 is input to trigger element K2 and thereafter passed on with signal Z1=1. Thus, at instant 43 this signal Z1=1 signals only the polarity of signal D1. At instant 83, the next readout instant, the coarse Raster counter has counter reading 01 and with operating position 01 of switch SW4 the bit S12=0 is input to trigger element K2. In this way the first bit of time slot pattern word 01 is supplied from instant 83 with signal Z1. At the next readout instant 123 the coarse Raster counter has counter reading 10 and in this way bit S13=1 is input to trigger element K2 and subsequently also the second bit of time slot pattern word 01 is dispatched with signal Z1=1. At instant 123 adder AD2 adds the words 10+01=11, because signals 1 are applied to element AND2 both from the output of element NAND2 and from inverter IN2. In this way the coarse Raster counter reaches counter reading 11 which is transferred to locations S36, S37 and continues to be stored in locations S16, S17 as well as in locations S36, S37 until the next bit transition appears, because only with B3=0 is word 00 read into locations S36, S37, thereby erasing the coarse Raster counter. As long as the coarse Raster counter occupies its counter position 11, switch SW4 has operating position 11, so that from instant 123 until the next bit transition always bit S11=1, and thereby signal Z1=1 is produced.

Table 1 shows the upward counting of the coarse Raster counter. At instant 15 the counter is first reset with signal B3=0 and word 00 is read into locations S36, S37. At the next readout instant 43 the word 01 is added in adder AD2 with signal E=1 and signal IN2=1, resulting in counter reading 01. At the next readout instants 83 or 123 this counter reading is increased to 10 or 11, as the case may be. This counter reading 11 is decoded with the aid of element NAND2 and with signal E=0 the output of signal B3=0 is permitted only if the pulse message was read in full. To explain the effect of a bit transition, it was assumed at instant 3 that word 11 is stored in locations S16, S17. With this a signal was given that the preceding pulse message was transmitted in full.

Figure 4:
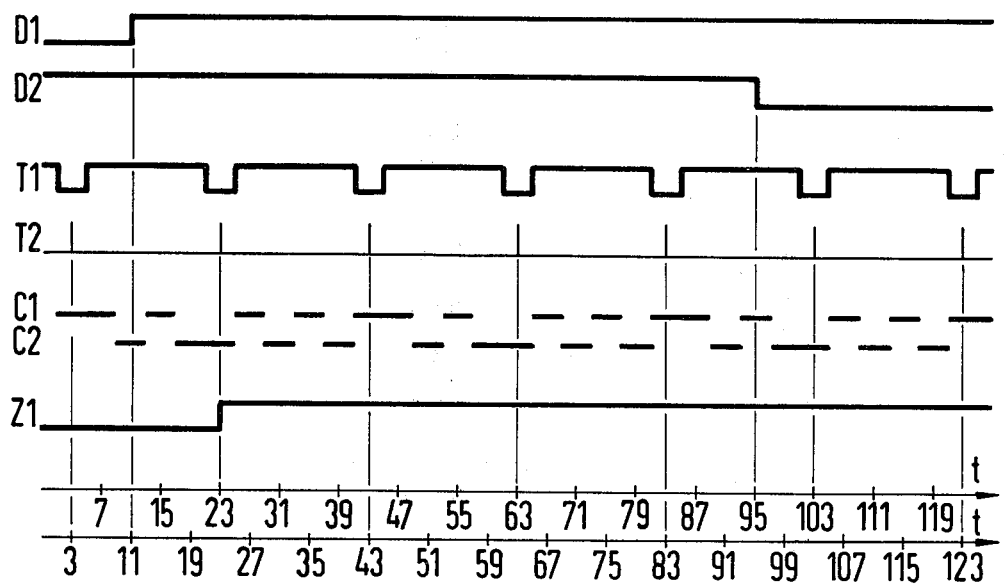

FIG. 4 illustrates some of the signals of FIG. 3 on a reduced scale. Readout instants 83 and 123 listed in Table 1 are also shown in FIG. 4. It is also apparent from FIG. 4 that a bit transition of signal D2 does not occur until instant 95. The operation of the switching arrangement of FIG. 2 relating to address "two" will be described hereinbelow with reference to FIGS. 3 and 4 and Table 2.

Address "Two"

Table 2 refers to the operating positions of the switches SW2 and SW3 of FIG. 2 shown by the dotted line. The bits listed under locations S21 to S27 are available at the outputs of these locations at the instants shown. The bits shown under locations S31 to S37 are applied to the inputs of these locations at the instants indicated.

For example, it is assumed that at instant 11 the word 1011010 is supplied via the outputs of locations S21 to S27. Bits 10 of locations S26, S27 signal that pulse message 101 was not transmitted in full. At readout instants 23 switch SW4 has operating position 10, so that bit S23=1 is input to trigger element K2 and signal Z1=1 is dispatched. Thus, the last bit of pulse message 101 is output, so that the full transmission of the pulse message is signaled by counter reading 11 of locations S36, S37. From instant 23 until instant 51 the fine Raster with adder AD1 and locations S24, S25, S34, S35 is counted upward. This is of no consequence, however, because during this time no bit transition occurs.

At instant 63, bit S21=1 is output with signal Z1=1 and also the fine Raster counter is reset to counter reading 00. As illustrated in FIG. 4, at instant 95 a bit transition of signal D2 has occurred, but this cannot be signaled until instant 99, because only at this instant is address "two" set, as shown in diagram C2. Thus, at instant 99 pulse message 011 is read into locations S31, S32, S33 and at the next readout instant 103 transferred to locations S21, S22, S23. The processes at instant 103 correspond to those at instant 43 (Table 1). At instant 103 the coarse Raster counter has counter reading 00 (Table 2), so that bit S21=0 is read out and signal Z1=0 is dispatched. At the same time, the counter reading of this readout counter is incremented by one unit, resulting in counter reading 01, as shown by locations S36, S37. At the next two readout instants (not shown in Table 2) bits S22=1 and S23=1 are read out with signals Z1=1 and Z1=1, respectively. These processes are largely identical with those described with reference to Table 1. In this way, binary digit D2=1 is signaled by bit S21=1 from instant 11 until instant 99 and binary digit D2=0 is signaled from instant 103.

end the time-division multiplex frame. Signal Z1 is identical with transmit-end signal Z1.

Receive-End Processing Unit VE

Address "One"

Figure 6:
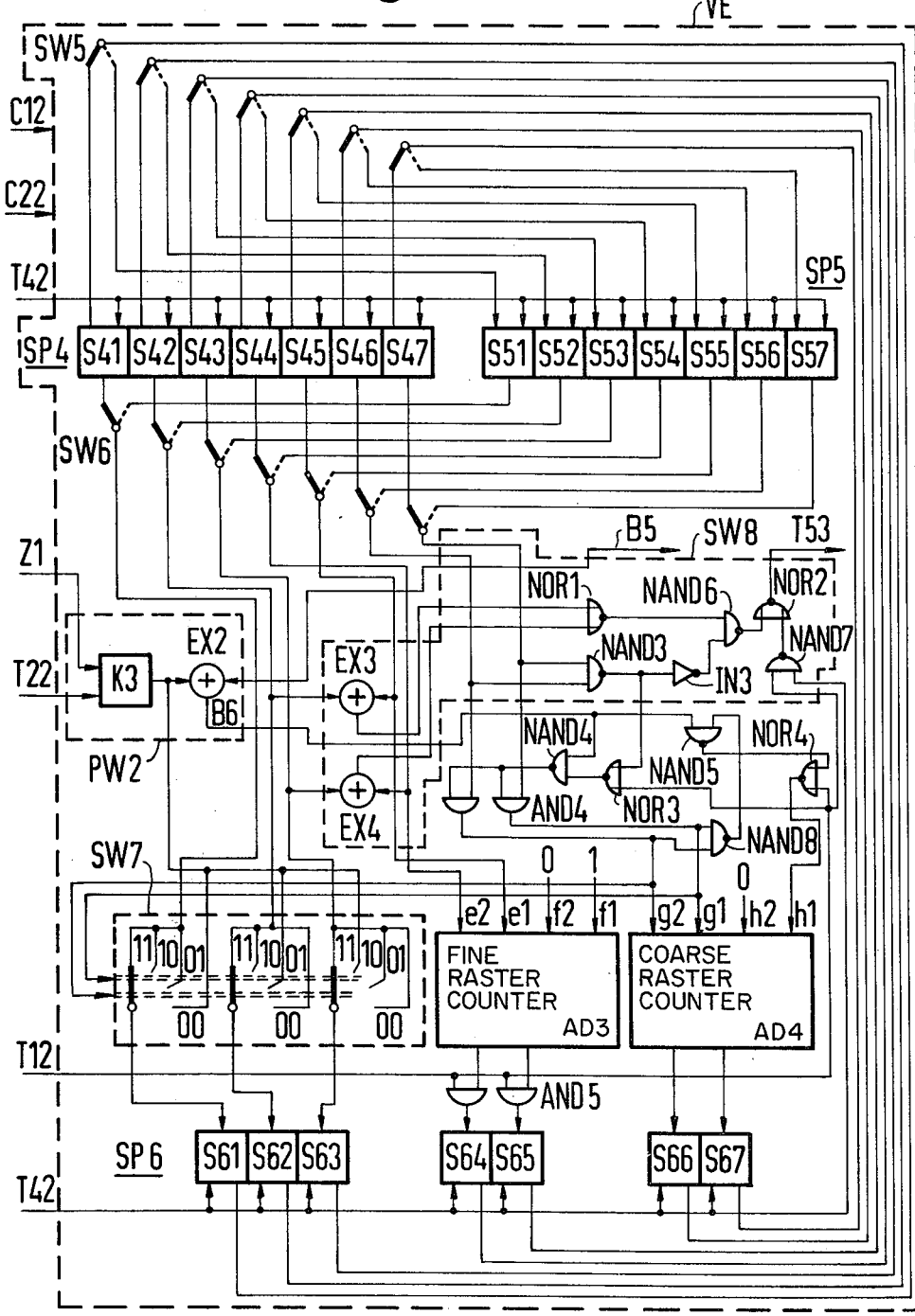
FIG. 6 is a practical embodiment of a receive-end processing unit for the centralized processing of pulse messages.

FIG. 6 shows in greater detail the receive-end processing unit VE shown schematically in FIG. 1, in cases where only two channels are provided and thus only two addresses are produced. Throughout the duration of address "one" or "two," as the case may be, switches SW5 and SW6 occupy their switch positions as shown respectively by the solid and dotted lines. The operation of the switching arrangement of FIG. 6 will be described hereinbelow with address "one" set and with reference to the signals shown in FIG. 7 and to Table 3.

Table 3 shows under the reference symbols of trigger element K3 and of storage locations S41 to S47 the binary digits supplied from the outputs of these locations. Under the reference symbols of locations S61 to S67 are shown the binary digits applied to the inputs of these locations. The data of locations S41 to S47 are read with clock signal T42=0, data are transferred to locations S61 to S67 with the positive pulse edges of signal T42, and with signal T42=1 the data stored in locations S61 to S67 are read into locations S41 to S47

TABLE 2

| t | S21 | S22 | S23 | a2 S24 | a1 S25 | S26 | S27 | Z1 | S31 | S32 | S33 | S34 | S35 | S36 | S37 |
|---|-----|-----|-----|--------|--------|-----|-----|----|----|----|----|----|----|----|----|
| 11 | 1 | 0 | 1 | 1 | 0 | 1 | 0 | 0 | 1 | 0 | 1 | 1 | 1 | 1 | 0 |
| 19 | 1 | 0 | 1 | 1 | 1 | 1 | 0 | 0 | 1 | 0 | 1 | 0 | 0 | 1 | 0 |
| 23 | 1 | 0 | 1 | 0 | 0 | 1 | 0 | 1 | 1 | 0 | 1 | 0 | 0 | 1 | 1 |
| 31 | 1 | 0 | 1 | 0 | 0 | 1 | 1 | 1 | 1 | 0 | 1 | 0 | 1 | 1 | 1 |
| 39 | 1 | 0 | 1 | 0 | 1 | 1 | 1 | 1 | 1 | 0 | 1 | 1 | 0 | 1 | 1 |
| 51 | 1 | 0 | 1 | 1 | 0 | 1 | 1 | 1 | 1 | 0 | 1 | 1 | 1 | 1 | 1 |
| 59 | 1 | 0 | 1 | 1 | 1 | 1 | 1 | 1 | 1 | 0 | 1 | 0 | 0 | 1 | 1 |
| 63 | 1 | 0 | 1 | 0 | 0 | 1 | 1 | 1 | 1 | 0 | 1 | 0 | 0 | 1 | 1 |
| 71 | 1 | 0 | 1 | 0 | 0 | 1 | 1 | 1 | 1 | 0 | 1 | 0 | 1 | 1 | 1 |
| 79 | 1 | 0 | 1 | 0 | 1 | 1 | 1 | 1 | 1 | 0 | 1 | 1 | 0 | 1 | 1 |
| 91 | 1 | 0 | 1 | 1 | 0 | 1 | 1 | 1 | 1 | 0 | 1 | 1 | 1 | 1 | 1 |
| 99 | 1 | 0 | 1 | 1 | 1 | 1 | 1 | 1 | 0 | 1 | 1 | 0 | 0 | 0 | 0 |
| 103 | 0 | 1 | 1 | 0 | 0 | 0 | 0 | 0 | 0 | 1 | 1 | 0 | 0 | 0 | 1 |
| 111 | 0 | 1 | 1 | 0 | 0 | 0 | 1 | 0 | 0 | 1 | 1 | 0 | 1 | 0 | 1 |
| 119 | 0 | 1 | 1 | 0 | 1 | 0 | 1 | 0 | 0 | 1 | 1 | 1 | 0 | 0 | 1 |

Central Processing Unit ZS

Figure 5:
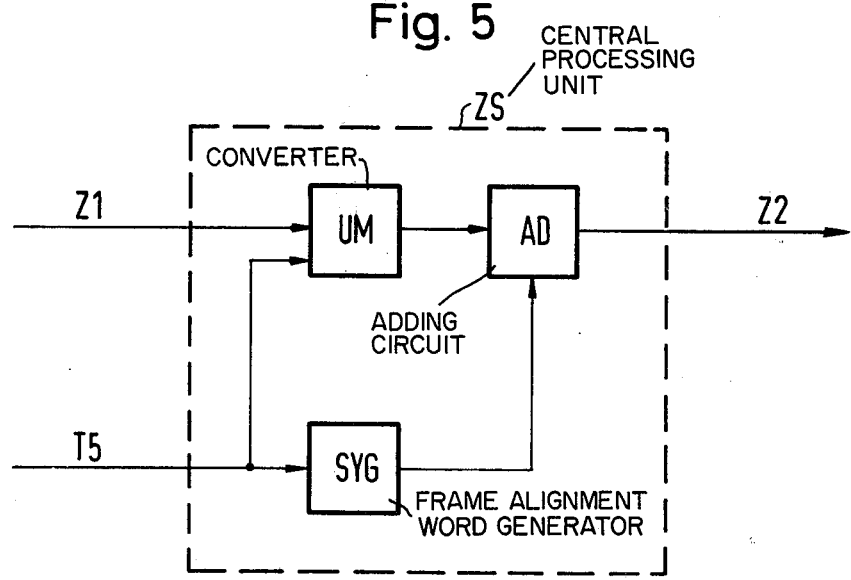
FIG. 5 is a block diagram of a transmit-end central processing unit.

Signal Z1 is applied to central processing unit ZS (FIG. 5) which basically comprises a converter UM, an adding circuit AD and a frame-alignment-word generator SYG. Signal Z1 is time compressed by means of converter UM so that there is a slot for each time-division multiplex frame into which is inserted a frame-alignment word produced with the aid of frame-alignment-word generator SYG. The insertion of the frame-alignment word is effected by means of adder AD over the output of which is dispatched signal Z2 containing on the one hand the data of signal Z1 and on the other, the frame-alignment word by means of which the time-division multiplex frame alignment is carried out. The central processing unit ZS mentioned above is known in the prior art, so that no further details need be given.

Signal Z2 is transmitted by means of send-side transmission equipment US, transmission circuit U and receive-end transmission equipment UE in a manner in itself known to the receive side and is routed to receive-end central processing unit ZE.

Receive-end central processing unit ZE is likewise known in the prior art and not detailed further herein. Signals Z1 the T52 are derived by means of central processing unit ZE. Signal T52 signals at the receive via switches SW5.

Figure 7:
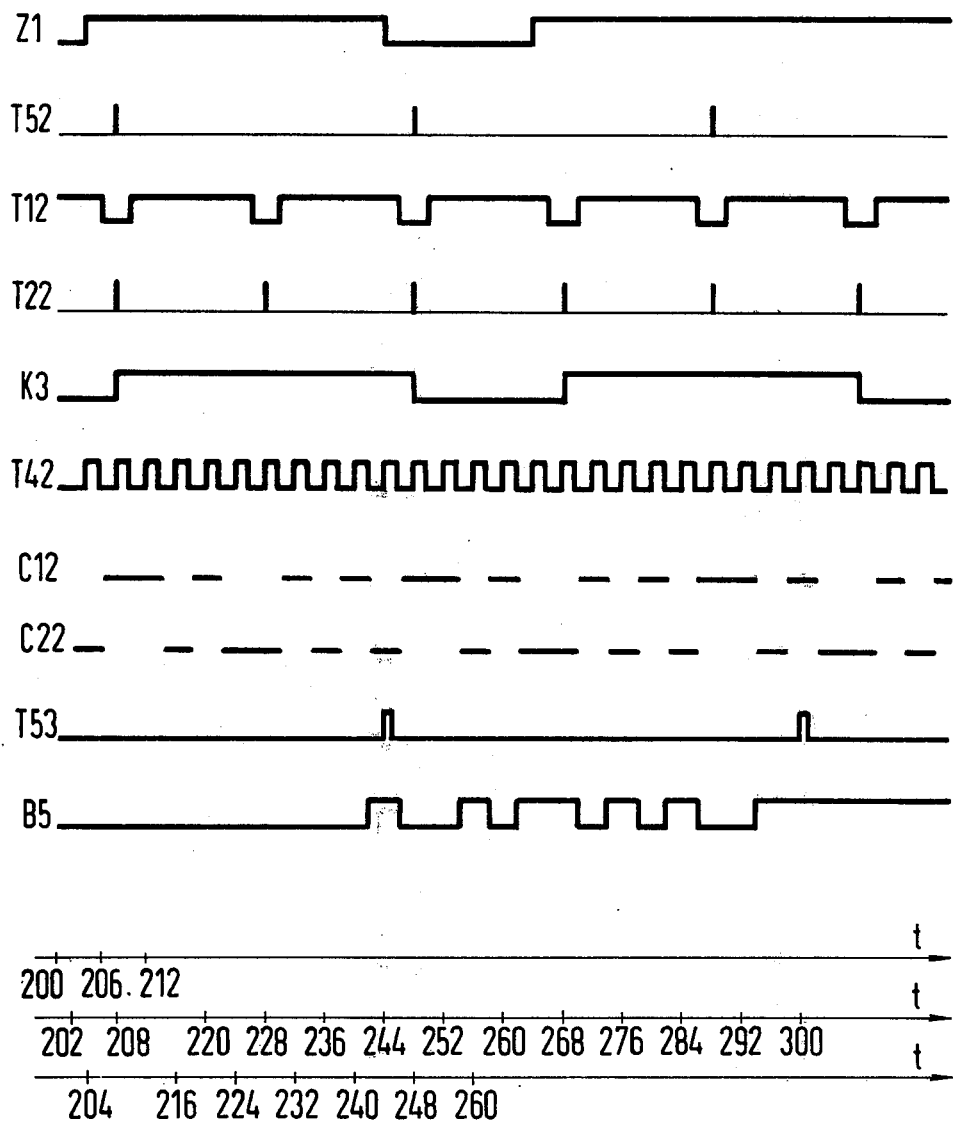
FIG. 7 shows a number of signals appearing during the operation of the processing unit shown in FIG. 6.

Signal Z1 is buffered in trigger element K3 of bit-transition discriminator PW2 in synchronism with the clock pulse pattern of signal T22, resulting in the signal K3 shown in FIG. 7. Bit transitions of signal Z1 are signaled with the aid of exclusive OR element EX2, because the old binary digit of signal Z1 is stored in location S41 and because the binary digit of signal K3 represents the new binary digit of signal Z1.

Switches SW7 may each occupy four operating positions labeled 00, 01, 10, 11 which are occupied whenever the control words 00, 01, 10 or 11 identified by identical labels are routed via the two control leads.

The adder AD3 adds the word e2, e1 to the word f2, f1=01 and supplies two digits of the result to the elements AND5, taking account of the carry-overs. The adder AD4 adds the words g2, g1 and h2, h1 and supplies a two-digit result to the locations S66, S67, taking account of the relevant carry-overs.

As shown in Table 3, it is assumed that at instant 200 the word 010 11 11 is stored in locations S41 to S47. The contents of locations S41, S42, S43 are transferred directly to storage locations S61, S62, S63, with the switches SW7 occupying the operating positions 11 shown by the solid line. It is assumed that signal B6=0 is dispatched from the output of element EX2, that a signal 1 is dispatched from the output of element NAND4 and that with S46, S47=11 via the outputs of elements AND4 the word 11 is likewise dispatched to the switches SW7, so that the operating positions 11 are set. In this way, the bits 010 are stored in locations S61 to S63.

With S44, S45=11 the words 11+01 are added in adder AD3, and with T12=1 the result 11 is transferred to locations S64, S65.

A signal 0 is applied to input $h1$ of adder AD4, because a signal 0 is dispatched from element EX2, because a signal 1 is dispatched from element NAND5, and because in this way two signals 1 are applied to element NOR4 which yield the signal $h1=0$. Under these conditions, the adder AD4 adds the word $g2$, $g1=11+h2$, $h1=00$, so that the result 11 is read into the locations S66, S67. The locations S46, S47 and the adder AD4 form together a coarse Raster counter whose counter reading 11 signals the full reception of the pulse messages.

S64, S65 receive the word 00 which is subsequently transferred to the locations S44, S45. The locations S44, S45 and the adder AD3 again form a fine Raster counter whose counter readings 00, 01, 10, 11 define individual time slots of the time-slot pattern. This fine Raster counter is always reset to counter reading 00 at the underlined readout instants 208, 248, 288 because at these instants the elements AND5 are disabled with the signal T12=0. Thus, the fine Raster counter is counted upward at the readout instants. For example, at instants 212 and 252, 220 and 260, 232 and 272 the respective counter readings 01, 00, or 11 are set.

At instant 208 the word 00 is applied to the inputs $g2$, $g1$ of the adder AD4, and with NAND8=1, NAND5=0, NOR4=0 and $h1=1$ the result 01 is produced which is read into the locations S66, S67. The counter reading 01 of the coarse Raster counter signals that at instant 208 the first bit of the pulse message was transferred to the location S61 of the buffer storage.

TABLE 3

| t | K3 | S41 | S42 | S43 | e2 S44 | e1 S45 | g2 S46 | g1 S47 | Z1 | S61 | S62 | S63 | S64 | S65 | S66 | S67 |
|---|----|-----|-----|-----|--------|--------|--------|--------|----|-----|-----|-----|-----|-----|-----|-----|
| 200 | 0 | 0 | 1 | 0 | 1 | 1 | 1 | 1 | 0 | 0 | 1 | 0 | 0 | 0 | 1 | 1 |
| 204 | | | | | | | | | 1 | | | | | | | |
| 208 | 1 | 0 | 1 | 0 | 0 | 0 | 1 | 1 | 1 | 1 | 1 | 0 | 0 | 0 | 0 | 1 |
| 212 | 1 | 1 | 1 | 0 | 0 | 0 | 0 | 1 | 1 | 1 | 1 | 0 | 1 | 0 | 0 | 1 |
| 220 | 1 | 1 | 1 | 0 | 0 | 1 | 0 | 1 | 1 | 1 | 1 | 0 | 1 | 0 | 0 | 1 |
| 232 | 1 | 1 | 1 | 0 | 1 | 0 | 0 | 1 | 1 | 1 | 1 | 0 | 1 | 1 | 0 | 1 |
| 240 | 1 | 1 | 1 | 0 | 1 | 1 | 0 | 1 | 1 | 1 | 1 | 0 | 0 | 0 | 0 | 1 |
| 244 | | | | | | | | | 0 | | | | | | | |
| 248 | 0 | 1 | 1 | 0 | 0 | 0 | 0 | 1 | 0 | 1 | 0 | 0 | 0 | 1 | 1 | 0 |
| 252 | 0 | 1 | 0 | 0 | 0 | 0 | 1 | 0 | 0 | 1 | 0 | 0 | 1 | 0 | 1 | 0 |
| 260 | 0 | 1 | 0 | 0 | 0 | 1 | 1 | 0 | 0 | 1 | 0 | 0 | 1 | 1 | 1 | 0 |
| 272 | 0 | 1 | 0 | 0 | 1 | 0 | 1 | 0 | 0 | 1 | 0 | 0 | 1 | 1 | 1 | 0 |
| 280 | 0 | 1 | 0 | 0 | 1 | 1 | 1 | 0 | 0 | 1 | 0 | 0 | 0 | 0 | 1 | 0 |
| 284 | | | | | | | | | 1 | | | | | | | |
| 288 | 1 | 1 | 0 | 0 | 0 | 0 | 1 | 0 | 1 | 1 | 0 | 1 | 0 | 0 | 1 | 1 |
| 292 | 1 | 1 | 0 | 1 | 0 | 0 | 1 | 1 | 1 | 1 | 0 | 1 | 0 | 1 | 1 | 1 |
| 300 | | 1 | 0 | 1 | 0 | 1 | 1 | 1 | | | | | | | | |

At instant 204 there appears a positive pulse edge of signal Z1 which, however, is not signaled until instant 208 with signal K3=1, because only at this instant does a pulse of signal T22 appear during the duration of address "one," as shown in diagram C12. In addition, at instant 208 word 110 00 01 is transferred to locations S41 to S47 from locations S61 to S67. With signal K3=1 and signal S41=0 a signal 1 is dispatched to one input of element NAND4 from the output of element EX2. With S46, S47=11 a signal 0 is produced at the output of element NAND3 and at one input of element NOR3. With signal T12=0 a signal 0 is also applied to the second input of element NOR3, so that a signal 1 is dispatched to element NAND4 via the output of element NOR3 and signals 0 are applied to elements AND4 via the output of element NAND4. In this way there is obtained at the outputs of elements AND4 the word 00 which controls switch SW7 to the position 00. The same output is also routed to the inputs $g2$, $g1$ of adder AD4.

Now, when the switch SW7 is in the operating position 00, the bit K3=1 is transferred to the locations S61, whereas the other two bits 10 are read into the locations S62, S63 without change. Instant 208 is a readout instant and is important in that, at this instant, the bit K3=1, signaling the new polarity, is first transferred to the buffer storage S61 and is later read into the register location S41.

There is applied to adder AD3 on the one hand the word $e2$, $e1=00$ and on the other, the word $f2$, $f1=01$, yielding the result 01, but on account of the signal T12=0 and the elements AND5 this result is not transferred to the locations S64, S65. Thus these locations At instant 212 the word 1100001 of the locations S61 to S67 is transferred to the locations S41 to S47. Above all, the bit S41 is important because it signals the bit transition that took place and is passed on at a subsequent instant with the aid of the signal B5.

The word 110 is always buffered in the locations S61, S62, S63 at instants 212, 220, 232 and 240 because the switch SW7 occupies the operating position 01 and because K3=1.

At instants 212, 220, 232, 240 the fine Raster counter with the adder AD3 is counted upward, as mentioned earlier, resulting in the counter readings 01, 10, 11, 00.

At instants 212, 220, 232, 240 with T12=1 a signal 0 is dispatched from the NOR4 element, so that with $h2$, $h1=00$ the counter reading does not change and the result 01 is buffered in the locations S66, S67 via the outputs of adder AD4.

At instant 244 the binary digit of signal Z1 changes and is now Z1=0. As shown in Table 1, the binary digit Z1=1 at instant 204 is the same as the binary digit Z1=1 at instant 43. However, as shown in Table 1, the binary digit Z1=0 is obtained at instant 83 after 40 time units and at instant 244 the binary digit Z1=0 shown in Table 3 is exactly the same as this binary digit. At instant 248 this binary digit Z1=0 is transferred to trigger element K3. At this instant 248 the element EX2 produces a signal 1, the element NAND3 likewise produces a signal 1, the element NOR3 produces a 0 signal owing to T12=0, and the element NAND4 produces a signal 1, so that the word 01 of locations S46, S47 is applied to the switch SW7 and to the adder AD4.

When switch SW7 is in the operating position 01 the binary digits of the locations S41 and S43 are transferred directly to the locations S61 and S63, respectively, whereas the bit K3=0 is buffered in location S62. In this way the first bit of the time slot pattern information is in the buffer storage and is transferred to location S42 at instant 252, where it continues to be stored until instant 300. $h2, h1=01$ with $T12=0$ so that the counter with the adder AD4 is counted upward and the counter reading 10 is stored in locations S66, S67. This counter reading 10 indicates at the same time that the second bit of the pulse message, viz. the bit S62=0, has now been transferred to the buffer storage. At instants 252, 260, 272, 280 the word 10 of locations S66, S67 does not change since at these time slots $T12=1, h1$ is always 0.

From instant 244 the signal Z1 again changes after 40 time units, so that the signal Z1=1 appears at instant 284. This binary digit is the same as the binary digit Z1=1 listed in Table 1 at instant 123. At instant 288 this binary digit Z1=1 is transferred to trigger element K3 and when the switch SW7 occupies its operating position 10, the bit K3=1 is transferred to the buffer storage S63. Thus the third bit of the pulse message is now also in the buffer storage, viz. in location S63. This is signaled by the word 11 of locations S66, S67.

Looking back, it can be seen that at readout instant 208 the first bit of the pulse message was transferred to location S61, that at the next readout instant 248 the second bit of the pulse message was transferred to location S62, and that the third bit of the pulse message at readout instant 288 was transferred to location S63. Subsequently, the whole pulse message 101 was transferred to locations S41 to S43. Thus it is certain that with the bit S41=1 the next bit transition is signaled and that this bit is passed on with the signal B5=1 to the channel units KE1 to KEn shown in FIG. 1. Which of the channel units actually receives this bit B5=1 depends on the position of the switch of demultiplexer DEMUX. Since in the present case only the address "one" has been discussed, the switch of demultiplexer DEMUX occupies the operating position shown by the solid line, so that the transfer of the bit B5=1 to the first channel unit KE1 is assured. However, the instant when this occurs depends on the signal T53, which is supplied to the channel unit KE1 by the demultiplexer DEMUX. The instant when this is to occur is already known because of the pulse message. This is the instant 01 which continues to be stored in locations S42, S43 from instant 292 until the signal B5=1 has actually been transferred to the channel unit KE1.

From instant 288 the fine Raster counter again starts its counting cycle and at instant 292 it reaches the counter reading 01 which at instant 300 is stored in locations S44, S45. This counter reading 01 represents an actual time value, in contrast to the bits 01 of the pulse message, which represent a desired time value. At instant 300 the desired value of the pulse message 01 is identical with the actual value 01 of the locations S44, S45, so that with the aid of the signal T53=1 the signal B5=1 must now be read into the channel circuit KE1 of FIG. 1.

To be more precise, the contents of the locations S42 and S44 and of the locations S43 and S45 are continually being compared with the elements EX3, EX4 of the switch SW8 and at instant 300 both elements EX3, EX4 supply signals 0, so that a signal 1 is dispatched to an input of element NAND6 via the element NOR1. The element NAND3 signals the word 11 of the locations S46, S47 and dispatches a signal 0, which signals the full reception of the pulse message. A signal 1 is dispatched via the inverter IN3 so that signals 1 are applied to both inputs of the element NAND6 and a signal 0 is supplied via its output to an input of the element NOR2. With T12=1 and T42=1 a signal 0 is dispatched from the element NAND7, so that the element NOR2 supplies a signal 1 which, as signal T53=1, activates the channel unit KE1 shown in FIG. 1. Thus the signal B5=1 is transferred to the channel unit KE1 at the time when it had to be transferred in conformity with the pulse message.

The bit transitions of the signal D1 shown in FIG. 3 and occurring at the transmit end are thus signaled at corresponding instants of the channel unit KE1 of FIG. 1. This results in substantially constant delays caused by the transmission of the signals with the aid of the transmission equipments US and UE. Also, small insignificant time-slot-pattern errors occur because the appearance of the bit transitions with respect to time is digitally interpreted and signaled.

Address "Two"

The operating positions of the switches SW5, SW6 shown in FIG. 6 by the dotted line and the Table 4 relate to the address "two." As shown in Table 4, at instant 204 the word 1000101 is stored in the locations S51 to S57. The fine Raster counter, including the locations S54, S55 and the adder AD3, is counted upward at instants 204, 216, 224. With the word 10 in the locations S66, S67 at instants 204, 216, 224 a signal is given that already two bits of the pulse message are stored in the buffer locations S61, S62. Instant 228 is a readout instant during which also the third bit of the pulse message is transferred to and buffered in location S63. Pulse message 101 is now complete; this is signaled by the word 11 of locations S66, S67.

From instant 236 the pulse message 101 is stored in locations S51 to S53 and now an agreement is awaited between the instant 01 indicated in the pulse message and the actually measured instant 01 which is stored in locations S54, S55. This agreement is achieved at instant 244, so that signal T53=1 is supplied at this instant. From instant 204 throughout the duration of the address "two" the signal B5 was already delivered with the bit S51=1 to the channel units KE1 to KEn shown in FIG. 1. However, not until instant 244 does the demultiplexer DEMUX occupy the operating position shown by the dotted line and only at this instant 244 is the signal T53=1 supplied, so that the signal B5=1 is transferred to the channel unit KE2.

TABLE 4

| t | K3 | S51 | S52 | S53 | e2 S54 | e1 S55 | g2 S56 | g1 S57 | Z1 | S61 | S62 | S63 | S64 | S65 | S66 | S67 |
|---|----|----|----|----|----|----|----|----|----|----|----|----|----|----|----|----|
| 204 | 0 | 1 | 0 | 0 | 0 | 1 | 0 | 1 | 1 | 1 | 0 | 0 | 1 | 0 | 1 | 0 |
| 216 | 1 | 1 | 0 | 0 | 1 | 0 | 1 | 0 | 1 | 1 | 0 | 0 | 1 | 1 | 1 | 0 |
| 224 | 1 | 1 | 0 | 0 | 1 | 1 | 1 | 0 | 1 | 1 | 0 | 0 | 0 | 0 | 1 | 0 |
| 228 | 1 | 1 | 0 | 0 | 0 | 0 | 1 | 0 | 1 | 1 | 0 | 1 | 0 | 0 | 1 | 1 |
| 236 | 1 | 1 | 0 | 1 | 0 | 0 | 1 | 1 | 1 | 1 | 0 | 1 | 0 | 1 | 1 | 1 |

TABLE 4-continued

| t | K3 | S51 | S52 | S53 | e2 S54 | e1 S55 | g2 S56 | g1 S57 | Z1 | S61 | S62 | S63 | S64 | S65 | S66 | S67 |
|---|----|-----|-----|-----|--------|--------|--------|--------|----|----|-----|-----|-----|-----|-----|-----|
| 244 | 1 | 1 | 0 | 1 | 0 | 1 | 1 | 1 | 1 | 1 | 0 | 1 | 1 | 0 | 1 | 1 |

TABLE 5

| T1 | B3 | C2 | C1 | u | v | w |
|----|----|----|----|---|---|---|
| 1 | 1 | 1 | 1 | 0 | 0 | 1 |
| 1 | 0 | 1 | 1 | 1 | 0 | 0 |
| 1 | x | 0 | 0 | 1 | 0 | 1 |
| 1 | x | 0 | 1 | 0 | 0 | 1 |
| 1 | x | 1 | 0 | 0 | 0 | 1 |
| 0 | x | 0 | 0 | 0 | 1 | 1 |
| 0 | x | 0 | 1 | 0 | 1 | 1 |
| 0 | x | 1 | 0 | 0 | 1 | 1 |
| 0 | x | 1 | 1 | 0 | 0 | 1 |

TABLE 6

| t | T1 | S11 | S12 | S13 | S14 | c1 S15 | c2 S16 | B2 | S31 | S32 | S33 | S34 | S35 | S36 |
|---|----|-----|-----|-----|-----|--------|--------|----|----|-----|-----|-----|-----|-----|
| 3   | 0 | 0 | 0 | 1 | 0 | 1 | 1 | 0 | 0 | 0 | 1 | 0 | 1 | 1 | 0 |
| 7   | 1 | 0 | 0 | 1 | 0 | 1 | 1 | 0 | 0 | 0 | 1 | 0 | 1 | 1 | 0 |
| 27  | 1 | 0 | 0 | 1 | 0 | 1 | 1 | 1 | 1 | 0 | 1 | 0 | 1 | 1 | 0 |
| 35  | 1 | 1 | 0 | 1 | 0 | 1 | 1 | 1 | 1 | 1 | 1 | 1 | 0 | 0 | 0 |
| 43  | 0 | 1 | 1 | 1 | 1 | 0 | 0 | 1 | 1 | 1 | 1 | 1 | 0 | 1 | 1 |
| 47  | 1 | 1 | 1 | 1 | 1 | 1 | 1 | 1 | 1 | 1 | 1 | 1 | 0 | 1 | 1 |
| 83  | 0 | 1 | 1 | 1 | 1 | 1 | 0 | 1 | 1 | 1 | 1 | 1 | 1 | 0 | 1 |
| 87  | 1 | 1 | 1 | 1 | 1 | 1 | 0 | 1 | 1 | 1 | 1 | 1 | 1 | 0 | 1 |
| 95  | 1 | 1 | 1 | 1 | 1 | 1 | 0 | 1 | 1 | 1 | 1 | 1 | 1 | 0 | 1 |
| 107 | 1 | 1 | 1 | 1 | 1 | 1 | 0 | 1 | 1 | 1 | 1 | 1 | 1 | 0 | 1 |
| 115 | 1 | 1 | 1 | 1 | 1 | 1 | 0 | 1 | 1 | 1 | 1 | 1 | 1 | 0 | 1 |
| 123 | 0 | 1 | 1 | 1 | 1 | 1 | 0 | 1 | 1 | 1 | 1 | 1 | 1 | 1 | 1 |

Modified Transmitter Processing Unit VS

Figure 8:
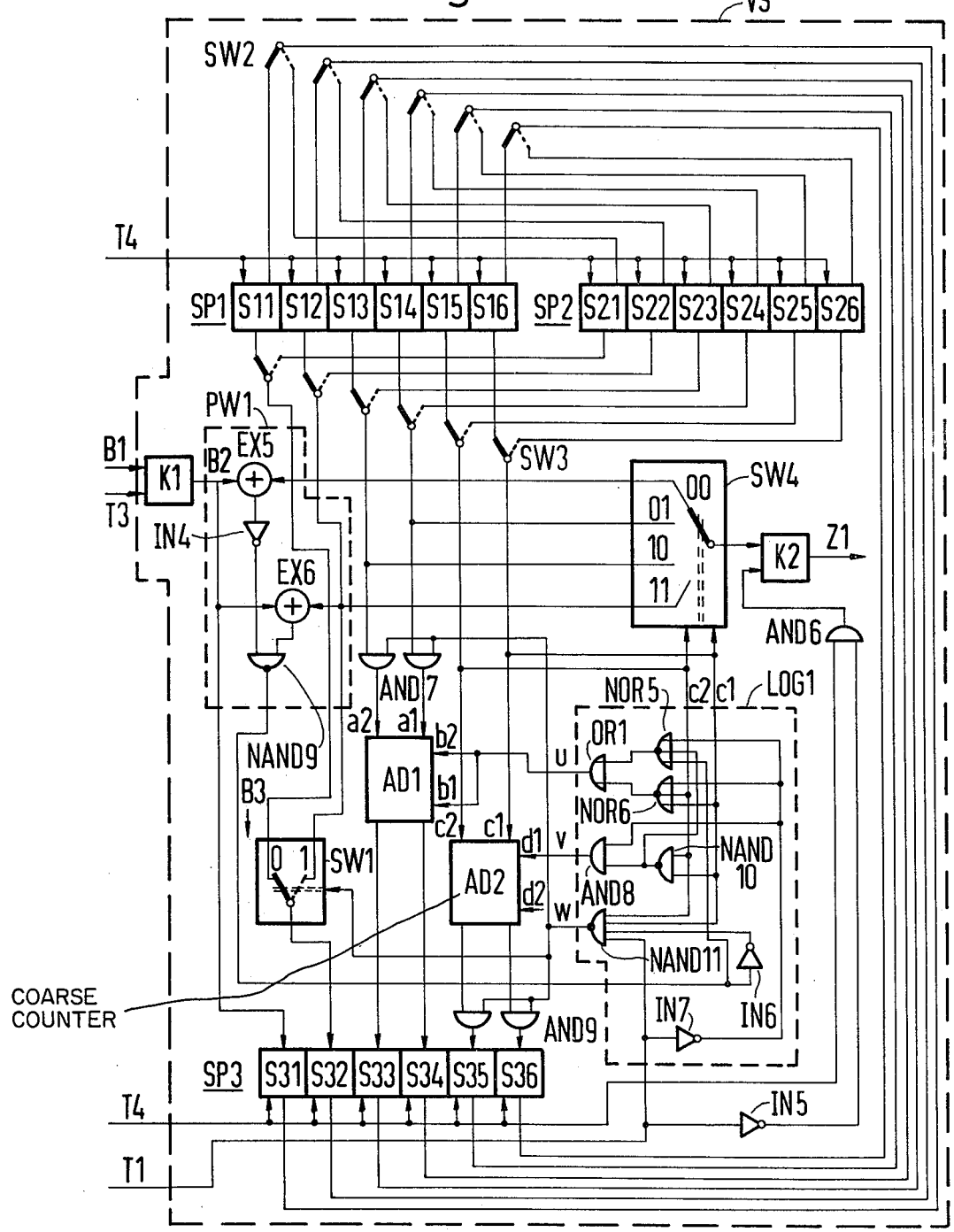
FIG. 8 is a further practical embodiment of a transmit-end processing unit.

FIG. 8 shows another preferred embodiment of a processing unit which may be employed as the processing unit VS shown in FIG. 1. Compared with the processing unit illustrated in FIG. 2, the processing unit depicted in FIG. 8 is characterized in that the storages SP1, SP2 have only six storage locations per address and that bit transitions can be recognized with a greater degree of certainty than if the switching arrangement of FIG. 2 is used. As shown in FIG. 8, the switches SW2, SW3, SW4, the storages SP1, SP2, SP3, the trigger elements K1, K2 and the adders AD1, AD2 operate in the same way as the components of FIG. 2 indicated by like reference symbols. However, some of these components are connected differently. Operating positions 0 and 1 of the switch SW1 depend on signal w and are occupied with w=0 and w=1, respectively. Again, a bit transition is signaled with the signal B3=0.

The logic circuit LOG1 receives on the input side the signals T1, B3, c2, c1 and dispatches via its outputs the signals u, v and w. It comprises the elements OR1, NOR5, NOR6, AND8, NAND10, NAND11, IN6, IN7. The operation of the logic circuit LOG1 is shown in Table 5.

The operation of the switching arrangement of FIG. 8 will be explained with reference to Tables 5 and 6, with the switches SW2, SW3 occupying the operating positions shown by the solid line in conformity with the address "one." It is assumed that at instant 3 the word 001011 is stored in locations S11 to S16. The signal B2=0 is always transferred to location S31. With T1=0, w equals 1, so that the contents of location S12 are transferred to location S32. With w=1 the elements AND7 are operated and the word 10 is applied to the inputs a2, a1 of the adder AD1. With u=0 the word 00 is applied to the two other inputs b2, b1 so that the word 10 is dispatched to locations S33, S34 via the output of adder AD1. With v=0 the adder AD2 adds 11+00=11, so that with w=1 the word 11 is buffered in locations S35, S36 via the elements AND9.

At instant 7 the word 001011 is transferred to locations S11 to S16. With T1=1, B3=1, c2=1, c1=1 w equals 1 and then the contents of location S12 are again transferred to location S32. With w=1 and u=0 the adder AD1 again adds the words 10+00 and transfers the result 10 to locations S33, S34. The adder AD2 operates as at instant 3 and dispatches the result 11 to locations S35, S36. At instant 15 the same operations are performed as at instant 7. At instant 27, the word 001011 is again transferred to locations S11 to S16. With B2=1 the new binary digit is transferred to location S31. The other operations are performed as at instants 7 and 15.

At instant 35 the bit transition that has occurred is already stored in location S11, so that the element EX5 supplies a signal 0 and the inverter IN4 supplies a signal 1. However, the new binary digit is not yet stored in location S12, so that the element EX6 likewise dispatches a signal 1 to the element NAND9 and, as a consequence, the signal B3=0 signals the bit transition. This bit transition is found with a high degree of certainty, because not only the operations at time 27 but also those at time 35 are utilized. With T1=1, B3=0, c2=c1=1, w equals 0 and as a consequence the switch SW1 occupies its operating position 0, so that the new binary digit is transferred from location S11 to location S32. With w=0 and u=1 the adder AD1 adds the words 00 and 11, dispatching the result 11 to locations S33, S34. In this way the new binary digit 1 buffered in location S32 is assigned the time-slot-pattern bits 11. The pulse message thus reads 111. The adder AD2 adds further the words 11+00=11. However, this result is not interpreted, since with w=0 the word 00 is buffered in locations S35, S36.

Time 43 again is a readout instant. The pulse message 111 is stored in locations S12, S13, S14. With T1=0, w equals 1 and thereby the contents of location S12 are transferred to location S32. With w=1 and u=0 the adder AD1 adds the words 11+00, so that the result 11 is transferred to locations S33, S34. Thus the time-slot-pattern bits of the pulse message do not change. With S15, S16=0 the bit S11=1 is input to the trigger element K2 via the switch SW4. The conditions therefor are provided by the element AND6 to which two signals 1 are applied at instant 43. In this way, the bit S11=1 signaling the new binary digit is input to the trigger element K2 at instant 43 and passed on as signal Z1=1. The first bit of the pulse message is thus passed on with the aid of the signal Z1. With $v=1$ the adder AD2 adds the words 00+01, so that with $w=1$ the result 01 is transferred to locations S35, S36 via the elements AND9.

At time 47, $w=1$ with T1=1, $c2$, $c1=01$, $u=0$, $v=0$ and in this way the adder AD1 adds the words 11+00, so that the result 11 is transferred to locations S33, S34. The time-slot-pattern bits of the pulse message thus remain unchanged. At times 55, 67, 75 the same storage conditions continue to exist as at instant 47.

Instant 83 is again a readout instant when the bit S14 is read out via the trigger element K2 as the switch SW4 occupies its operating position 01. The signal Z1=1 signals one of the two time-slot-pattern bits. The adder AD2 adds 01+01=10 and with $w=1$ the result 10 is transferred to locations S35, S36.

At instant 87 the word 111110 is transferred to locations S11 to S16. The same storage occupancy exists at times 95, 107, 115.

At instant 123, the nextreadout instant, the switch SW4 takes the position 10, so that the bit S13 is read and also the second time-slot-pattern bit is signaled with the signal Z1=0. Thus, the third bit of the pulse message is now also produced.

The adder AD1 may again be viewed as a fine Raster counter in combination with locations S13, S14 with the aid of which the fine Raster bits of the pulse message are obtained. This fine Raster counter is always reset to 11 with T1=1, B3=0 and $c2$, $c1=11$, and with $u=1$, $w=0$ when a bit transition is signaled. Thereafter this fine Raster counter is counted upward with $w=1$ and $u=1$. At the first readout instant after a bit transition has been signaled the counter reading of the fine Raster counter is stored and transferred to the pulse message. Thereafter the counter reading of the fine Raster counter remains constant until the pulse message is transmitted completely.

The adder AD2 may again be called a coarse Raster counter in combination with locations S15, S16 whose counter reading is reset with T1=1, B3=0, $c2=1$, $c1=1$, $w=0$, with the appearance of a bit transition. Thereafter the counter reading of this coarse Raster counter is counted upward at the readout instants, so that all bits of the pulse message can be read out with the aid of the switch SW4.

The address "two" is set with the operating positions of the switches SW2, SW3 shown by the dotted line. The adder AD1 again forms a fine Raster counter in combination with locations S23, S24, and the adder AD2 forms a coarse Raster counter in combination with locations S25, S26. Both counters are operated in the same way as described with reference to the address "one."

Modified Receiver Processing Unit VE

Figure 9:
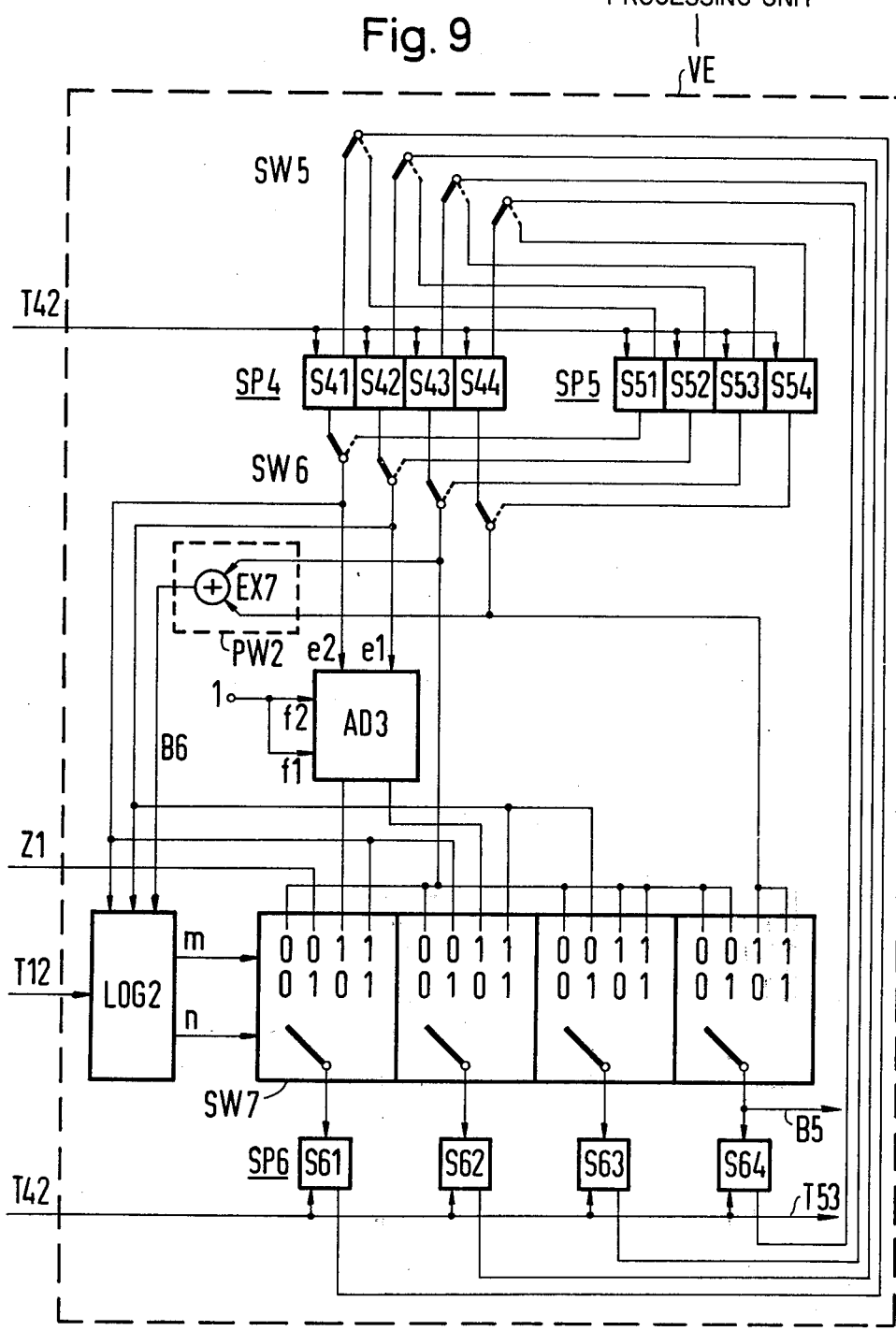
FIG. 9 is another practical embodiment of a receive-end processing unit.

FIG. 9 shows a further preferred embodiment of a receive-end processing unit VE which may be used in lieu of the switching arrangement shown in FIG. 6. The processing unit VE shown in FIG. 9 is characterized in that only four storage locations are needed for each address. For example, the storage locations S41–S44 and S51–S54 are provided for the addresses "one" and "two," respectively. The switches SW5, SW6 and the storages SP4, SP5, SP6 are operated in the same way as the components shown in FIG. 6 and indicated by like reference symbols. The adder AD3 adds to a word applied via inputs $e2$, $e1$ the word 11 applied via inputs $f2$, $f1$.

The operation of the logic circuit LOG2 is apparent from the Table 7. The logic circuit LOG2 has the inputs T12, $e2$, $e1$, B6 and the outputs $m$, $n$. The word 00 is dispatched via the outputs $m$, $n$ only if the word 1001 is applied to the inputs indicated in Table 7. The word 01 is applied via the outputs $m$, $n$ only if the signal T12=0. The word 10 is dispatched via the outputs $m$, $n$ only if with T12=1 and with B6=1 the binary digit 0 is not applied to both inputs $e2$, $e1$. The word 11 is dispatched via the outputs $m$, $n$ only if the signal T12=1 and B6=0. The binary digits labeled $x$ are 0 or 1, as desired.

Switches SW7 are controlled with the aid of the signals $m$ and $n$ and occupy the indicated operating positions as a function of these signals. Thus, with $m=0$ and $n=0$, all switches occupy the operating positions 00. In these operating positions 00 the contents of location S43 are transferred to all locations S61, S62, S63, and S64 of buffer storage SP6. When the new binary digit of signal Z1 is stored in this location S43, this new binary digit is buffered in all locations of storage SP6. With the word $m\,n=01$ the binary digit of the signal Z1 is transferred to location S61 and the contents of locations S41, S42 and S43 are transferred to locations S62, S63 and S64, respectively. Since subsequently the contents of locations S62–S67 are again stored in locations S42–S44, the word $m$, $n=01$ causes a relocation of the storage contents by one location from locations S41–S43 to locations S42–S44. With the word $m$, $n=10$ the outputs of adder AD3 are connected to location S61, respectively, S62. Thus, the word 11 is added to the binary digits of locations S41, S42 and the result is transferred to locations S61, S62. The contents of locations S43 and S44 are transferred directly to locations S63 and S64, respectively.

With the word $m$, $n=11$ the contents of storage SP4 are transferred to storage SP6 and subsequently the contents of storage SP6 are again transferred to storage SP4.

TABLE 7

| T12 | e2 | e1 | B6 | m | n |
|-----|----|----|----|---|---|
| 1 | 0 | 0 | 1 | 0 | 0 |
| 0 | x | x | x | 0 | 1 |
| 1 | 0 | 1 | 1 | 1 | 0 |
| 1 | 1 | 0 | 1 | 1 | 0 |
| 1 | 1 | 1 | 1 | 1 | 0 |
| 1 | x | x | 0 | 1 | 1 |

The operation of the switching arrangement of FIG. 9 will be described hereinbelow with reference to Tables 7 and 8 for the address "one." It is assumed that at instant 200 the word 0000 is stored in storage SP4 and that the word 1000 is applied to the input side of the logic circuit LOG2. This results in the word $m$, $n=11$, so that the word 0000 of storage SP4 is transferred to storage SP6. At instant 208 the contents of locations S61–S64 are transferred to locations S41–S44. This is a readout instant and with the signal T12=0 and the operating positions 01 of the switches SW7 the signal Z1=1 is transferred to location S61 and the contents of locations S41–S43 are transferred to locations S62–S64.

TABLE 8

| t | T12 | e2/S41 | e1/S42 | S43 | S44 | Z1 | S61 | S62 | S63 | S64 | m | n | B5 |
|---|---|---|---|---|---|---|---|---|---|---|---|---|---|
| 200 | 1 | 0 | 0 | 0 | 0 | 0 | 0 | 0 | 0 | 0 | 1 | 1 | |
| 208 | 0 | 0 | 0 | 0 | 0 | 1 | 1 | 0 | 0 | 0 | 0 | 1 | |
| 212 | 1 | 1 | 0 | 0 | 0 | 1 | 1 | 0 | 0 | 0 | 1 | 1 | |
| 248 | 0 | 1 | 0 | 0 | 0 | 0 | 0 | 1 | 0 | 0 | 0 | 1 | |
| 252 | 1 | 0 | 1 | 0 | 0 | 0 | 0 | 1 | 0 | 0 | 1 | 1 | |
| 288 | 0 | 0 | 1 | 0 | 0 | 1 | 1 | 0 | 1 | 0 | 0 | 1 | |
| 292 | 1 | 1 | 0 | 1 | 0 | 1 | 0 | 1 | 1 | 0 | 1 | 0 | |
| 300 | 1 | 0 | 1 | 1 | 0 | 1 | 0 | 0 | 1 | 0 | 1 | 0 | |
| 308 | 1 | 0 | 0 | 1 | 0 | 1 | 1 | 1 | 1 | 1 | 0 | 0 | 1 |

At instant 212 the switches SW7 occupy the operating positions 11 in which the contents of locations S41–S44 are transferred to locations S61–S64. The same processes also take place at instants 220, 232 and 240.

Instant 248 is again a readout instant and with T12=0 and Z1=0 the contents of locations S41–S44 are shifted one location, so that the word 0100 is first stored in locations S61–S64 and from instant 252 in locations S41–S44. The locations are occupied in the same way at instants 260, 272, 280.

Instant 288 is again a readout instant and with m, n=01, Z1=1 the data are shifted one location. At instant 292 with m, n=10 the number e2, e1=10 in adder AD3 is added to the number f2, f1=11 and the last two digits 01 of the result are transferred to locations S61, S62. Similar operations are performed at instant 300, the addition 01+11 yielding the result 00. At instant 308 the bit 1 stored in location S4 and signaling the new binary digit of signal Z1 is transferred to all locations S61–S64. In this way the signal B5=1 is dispatched and also the initial situation 1111 is set up in locations S61–S64 of the buffer storage. Signal B5=1 at time 308 is the same as signal Z1=1 at time 208.

Looking back, it can be seen that the complete pulse message 101 was transferred with the signal Z1 at instants 208, 248, 288. The signal Z1=1 indicates the new binary digit thereof at instant 208 and in conformity therewith the signal B5=1 is generated at instant 308. By contrast, the fine Raster bits 01 of the signal Z1 at instants 248 and 288 only serve to mark the instant when the signal B5=1 is produced. If the signal B5=0 had been generated instead of the signal B5=1, the word 0000 would have been read into locations S61–S64 and the initial situation would have resulted that was assumed at instant 200.

As mentioned earlier, the storages SP4, SP5, SP6 are controlled with the clock signal T42 in the same way as the storages shown in FIG. 6 and indicated by like reference symbols. As shown in FIG. 9, this clock signal T42 is used as clock signal T53 to control the demultiplexer DEMUX of FIG. 1.

If, instead of the address "one," the address "two" is set and the switches SW5, SW6 occupy the operating positions shown by the dotted line, then the storage SP5 is operated instead of the storage SP4 and the same operations are performed as described hereinabove with reference to Tables 7 and 8.

In general, there are provided not only two data sources, two channels and two data sinks but a larger number of data sources, channels and data sinks. In this case, as shown in FIGS. 2 and 8, one register each is provided at the transmit end for each channel and each address to cope with the storages SP1, SP2 shown therein. These registers are parts of an addressable mass storage, address signals being produced with the aid of the address generator AS of FIG. 1 and the data being restored in the same way as described with reference to FIGS. 2 and 8. At the receive end, too, one register of an addressable mass storage is provided for each channel and each address, similar to register SP4, SP5 of FIGS. 6 and 9. With the larger number of channels and addresses a larger number of such registers is required instead of the registers SP1, SP2, SP4, SP5, whereas the technical expenditure for the other components of the processing units shown in FIGS. 2, 6, 8 and 9 is independent of the number of channels and the number of addresses.

We claim:

1. A system for transmitting asynchronous bit transitions of data signals using time-division multiplexing, wherein the data signals are applied to a transmit-end multiplexer via a plurality of channels and there are produced with the aid of a transmit-end coarse Raster counter and a fine Raster counter pulse messages in which the bit transitions are signaled from the transmit end to the receive end and the transmit-end multiplexer and a receive-end mutliplexer are controlled with respective transmit-end and receive-end address signals, a clock signal being generated by means of a receive-end fine Raster counter activating the channel unit over which the data signal is applied to a data processing terminal equipment, wherein the improvement comprises transmit-end and receive-end registers (SP1, SP2 or SP4, SP5) for each channel (DQ1, DQ2 or DS1, DS2) which store the storage contents of respective transmit-end and receive-end buffer storages (SP3 or SP6) in synchronism with the clock pulse pattern of the address signals (C1, C2 or C12, C22);

a transmit-end and a receive-end bit-transition discriminator (PW1 or PW2) which receives via the respective transmit-end and the receive-end register at one input the old binary digit of the data signal (D1, D2) and at the other input, the new binary digit of the data signal, and which signals a bit transition with a respective transmit-end and a receive-end bit-transition signal when the old and the new digits differ (B3 or B6);

transmit-end and receive-end fine Raster counters (AD1 or AD3) connected respectively to the transmit-end and receive-end register (SP1, SP2 or SP4, SP5) operative to change the counter readings thereof with the bit-transition signal (B3 or B6);

a transmit-end pulse message switch (SW1) operable to read with the bit-transition signal (B3=0) the new binary digit of the data signal and the counter reading of the fine Raster counter (AD1) into the buffer storage (SP3);

the coarse Raster counters being connected on the input side to the registers (SP1, SP2 or SP4, SP5) and on the output side to the buffer storages (SP3 or SP6);

a transmit-end readout switch (SW4) whose operating positions are set by means of the transmit-end coarse Raster counter (AD2), whose inputs (00, 01, 10, 11) are connected sequentially to the locations of the registers (SP1, SP2) in which the individual bits of the pulse message are stored and over whose output the pulse message is delivered; and means for comparing the time-slot-pattern bits of the received pulse message and the counter reading of the receive-end fine Raster counter (AD3) operable upon agreement therebetween to generate said clock signal (T53) to activate the channel unit (KE1, KE2) assigned to the address (FIGS. 1, 2 6).

2. The system as defined in claim 1 in which the transmit-end and the receive-end register (SP1, SP2 or SP4, SP5) are parts of a respective transmit-end and a receive-end addressable mass storage which is controlled with the respective transmit-end and the receive-end address signals (C1, C2 or C12, C22) (FIG. 1).

3. The system as defined in claim 1 in which the transmit-end bit-transition discriminator (PW1) comprises a first and a second comparator means (EX5, EX6), that the first and the second comparator means are operable to signal a bit transition at different instants, said bit-transition signal (B3) being supplied only if the first comparator means (EX5) signals a bit transition and the second comparator means (EX6) signals no bit transition (Table 6, FIG. 8).

* * * * *